H. S. NEFF.
CULINARY STEAMER.
No. 177,147.   Patented May 9, 1876.
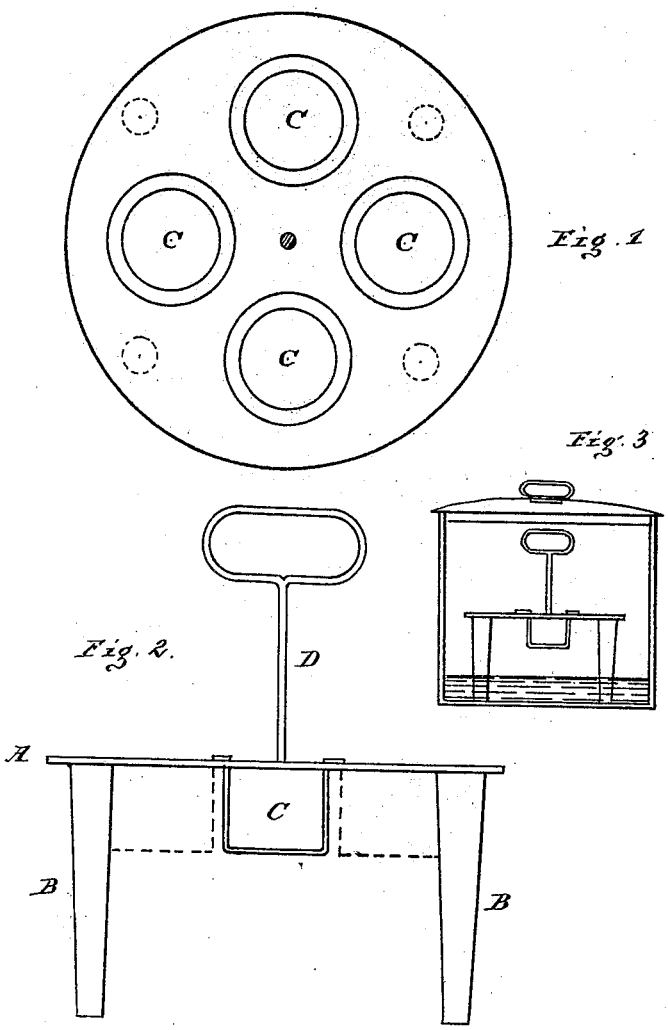
WITNESSES·
Benj. D. Danner
Geo H. Danner
INVENTOR·
Henry L Neff

UNITED STATES PATENT OFFICE.

HENRY S. NEFF, OF MANHEIM, PENNSYLVANIA.

IMPROVEMENT IN CULINARY STEAMERS.

Specification forming part of Letters Patent No. 177,147, dated May 9, 1876; application filed April 1, 1876.

*To all whom it may concern:*

Be it known that I, HENRY S. NEFF, of Manheim, in Lancaster county, and the State of Pennsylvania, have invented certain Improvements in Culinary Implements for Steaming Eggs or the like, of which the following is a specification:

The object of this invention is to provide a simple means for cooking eggs by steam as superior to being poached; and consists of separate cups set into openings in a circular disk, supported on legs and provided with a handle, which is set into an ordinary kettle containing sufficient water to generate steam.

The accompanying drawing, with the letters of reference marked thereon, and a brief explanation, will enable any one skilled in the art to make and use this invention.

Figure 1 shows the circular disk and flanged cups. The dotted lines indicate the four supports underneath. Fig. 2 is an elevation to show the legs and handle. Fig. 3 shows the application within an ordinary covered kettle.

The disk A is made of any desired diameter, and circular holes punched out to receive the egg-cups C. I show four, but do not confine myself to that number. This disk is supported above the water on legs B, and provided with a central handle, D. The cups C have flanges above to rest upon the perforated disk, and can be easily taken out or set in for cleaning or emptying the contents.

The eggs to be cooked by steaming are emptied from the shell each into its respective cup, and set in the disk of the steaming utensil—a deep tin kettle, such as are found in every kitchen, with covers, and of sufficient depth, and into which water is put and brought to a boil. The steaming apparatus, containing the eggs or the like in the cups, is now set into the kettle and covered and cooked by the steam only, not coming in contact with the water. Thus the eggs are speedily cooked, and can readily be inspected by simply raising the cover.

I may not be able to explain satisfactorily why steam-cooked eggs should be a decided improvement over poached eggs, but such is the verdict.

I am aware that wire and other kind of egg-holders have been employed for boiling or steaming eggs in the shell; also, that a patent, No. 133,205, dated November 19, 1872, called "a valuable egg-poacher," is used. This has fixed cups in a disk or inner pan, which cups, however, have perforated bottoms to admit the water, and are set in a shallow pan filled with water to the top of the cups in the inner pan. Such cups and a combination or utensil I do not use or claim.

What I claim is—

The perforated disk A, raised upon legs or supports B, and provided with a central handle, D, together with the flanged removable cups C, in combination with a deep covered tin kettle of the ordinary form, the whole arranged and operated substantially in the manner and for the purpose specified.

HENRY S. NEFF.

Witnesses:
   BENJ. D. DANNER,
   GEO. H. DANNER.